Aug. 14, 1945.                    D. SEITER                    2,382,510
                                 BORING TOOL
                             Filed July 26, 1943
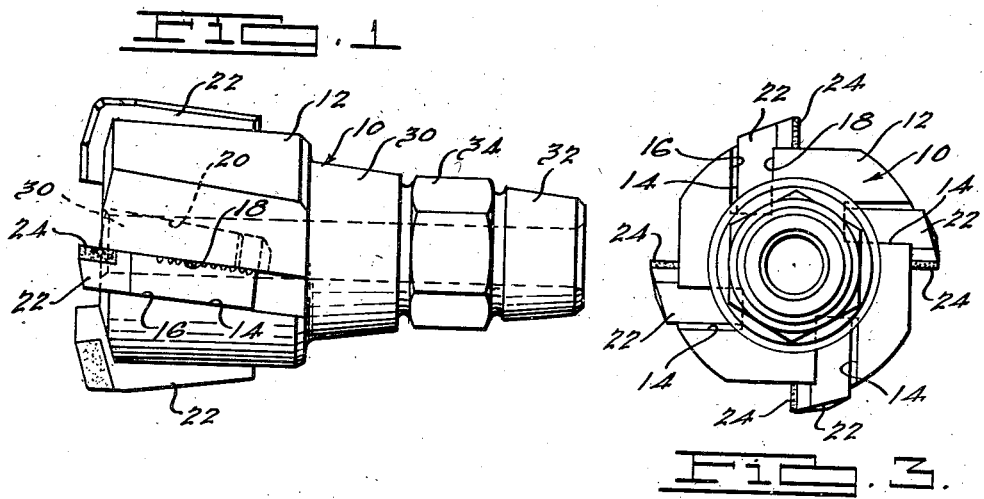
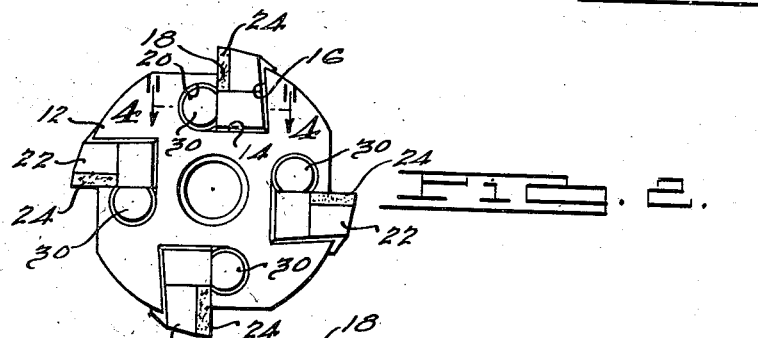
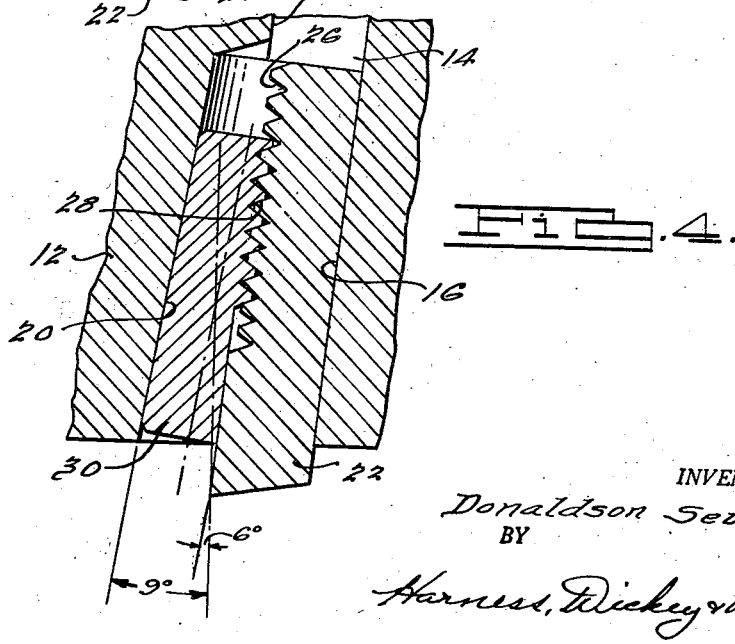
INVENTOR.
Donaldson Seiter.
BY
Harness, Dickey & Pierce.

Patented Aug. 14, 1945

2,382,510

UNITED STATES PATENT OFFICE 2,382,510

BORING TOOL

Donaldson Seiter, Detroit, Mich., assignor to Tungsten Carbide Tool Company, Detroit, Mich.

Application July 26, 1943, Serial No. 496,158

2 Claims. (Cl. 77—58)

The present invention relates to cutting tools and particularly relates to an inserted blade type of boring tool.

One of the primary objects of the present invention is to provide improvements in tools of the type mentioned which are of simplified structure so that they are economical to manufacture.

A further object of the invention is to provide improvements in tools of the type mentioned in which the cutter blades have inserts or tips of special cutting material, such as tungsten carbide, in the outer cutting edges thereof, and in which the means for holding each blade in position is so constructed and arranged that the insert is not engaged by the holding means, thereby increasing the life of the tool by preventing cracking or fracture to the tip, which would be caused by such engagement.

A further object of the invention is to provide a simplified structure for providing a dovetail action between a holding wedge and the cutter blade.

A further object of the invention is to provide an improved tool of the type mentioned in which the wedge openings may be formed by simple drilling and reaming operations and in which it is necessary to form only one flat surface in the blade slot which, in co-operation with the round wedge surface, gives accurate results. It has been found that the formation of two co-operating flat surfaces is troublesome, because both of such surfaces must then be held to a high degree of accuracy, which is expensive.

Other objects of the invention will become apparent from the following specification, the drawing relating thereto, and from the claims hereinafter set forth.

In the drawing, in which like numerals are used to designate like parts in the several views throughout:

Figure 1 is a side elevational view of a tool embodying features of the present invention;

Fig. 2 is a front elevational view of the tool shown in Fig. 1;

Fig. 3 is a rear elevational view of the tool shown in Fig. 1; and

Fig. 4 is an enlarged, fragmentary cross-sectional view taken substantially along the line 4—4 of Fig. 2.

Referring to the drawing, the tool of the present invention includes a body member generally indicated at 10, having a forward, enlarged portion 12 within which the cutter blades are adapted to be inserted. The body portion 12 is formed with a plurality of generally longitudinally extending slots 14 having flat side walls 16 and 18 which extend longitudinally of the body at an angle to the axis of rotation or longitudinal axis of such body. The side wall 16 also is disposed at an outwardly converging angle to the transverse axis of the tool body, as best seen in Fig. 2. The side 18 may be parallel to the transverse axis of the body. A plurality of such slots 14 are provided in the body portion 12, there being four shown for the purpose of illustration.

A wedge slot 20 is formed in the body portion 12 adjacent each of the slots 14. Such slot 20 is formed by simple drilling and reaming operations in such a location that it intersects the slot 14. The slot 20 is thus arcuate or circular over a portion of its cross section, and has a planular side portion which communicates with the adjacent slot 14. The longitudinal axis of slot 20 is disposed at an angle to the longitudinal axis of the tool body in the same diametral plane and also at an angle to the sides 16 and 18 of slot 14 when the sides are extended to intersect the diametral plane. This provides a dovetail lock on the tool and wedge. Specifically, for example, the sides 16 and 18 are disposed at an angle of six degrees with respect to the longitudinal axis of the cutter body, and the axis of slot 20 is disposed at an angle of nine degrees to the longitudinal axis of the tool body. Thus the slot 20 is disposed at an angle of three degrees to the sides 16 and 18 of slot 14.

A cutter blade 22 is disposed in each of the slots 14 and has side and bottom walls complementary in shape to the shape of the adjacent walls of slot 14. The outer cutting end of each of the cutters 22 has an insert 24 of special cutter material, tungsten carbide, for example, disposed therein. The tungsten carbide insert 24 provides a cutting tip. The manner in which the tip 24 is inserted in the blade 22 is well known in the art.

The inside face of blade 22 is provided with transverse serrations 26 which are adapted to cooperate with transverse serrations 28 formed on a wedge element 30. The serrations 26 are provided over a portion of the length of the inside wall of the cutter 22, and the serrations 28 are provided on a portion only of the length of the flat side of wedge 30. The remaining portions of the flat sides of the wedge and the adjacent face of cutter 22 bear against each other as best shown in Fig. 4.

The wedge 30 is formed complementary in cross section to the cross section of slot 20; thus, when the wedge and cutter blade are inserted in their respective slots and driven therein, the blades 22 are locked in position. The flat side 16 of slot 14 converges toward the side 18 in a direction from the base to the outside of the slot 14 and co-operates with the arcuate or rounded shape of slot 20 to provide the dovetail action where the slots are disposed at angles, such as those angles to the longitudinal axis of the body as mentioned above.

It will be seen, viewing Fig. 2 particularly, that the slot 20 is spaced inwardly of the periphery of the body portion 12 and that the intersection of slot 20 with slot 14 is below the innermost portion of insert 24. Thus the wedge 30 cannot overlap or overlie the insert 24 in any position. It has been found that best results are obtained where the insert 24 is free of any bearing engagement with the wedge, since, otherwise, during the use of the tool a hammering action on the tip results which causes cracking or fracture thereof.

It will be appreciated that wear in the cutter blades 22 may be taken care of by relocating the relative positions of the cutter blades 22 and wedges 30 in their co-operating serrations.

With the structure described above, the recesses 20 may be formed by simple drilling and reaming operations. These recesses co-operate with the one flat surface 16 to provide the wedging lock for the cutter blades. With this structure there is only the one flat locking surface to be formed, and in its co-operation with the round web surface, accurate results are obtained. This has advantages over prior types of cutters where two flat wedging surfaces are necessary to provide the wedging action. In the use of two flat surfaces it is necessary that they both be very accurately formed, which is expensive. Also, by having the angular relationship of the slots 14 and 20, as mentioned above, and by using the round surface in co-operation with a flat surface, a dovetail lock is provided; and only one angle on the flat side 16 is required to lock the blade in place. This further simplifies the manufacturing of the tool of the present invention.

In the embodiment illustrated the rear portion of the cutter body 12 is formed for driving engagement with a tool holder. Such rear portion is formed with frusto-conical portions 30 and 32 having interposed therebetween a hexagonal driving portion 34. These driving features of the cutter body 12 and their relation to a holder are disclosed and claimed in copending application of Donaldson Seiter Serial No. 496,159, filed concurrently herewith.

Formal changes may be made in the specific embodiment of the invention disclosed without departing from the spirit and substance of the invention, the scope of which is commensurate with the appended claims.

What is claimed is:

1. An inserted blade cutting tool comprising a body member having a slot therein extending longitudinally of said body with its sides disposed at an angle to the longitudinal axis of the body member and having one of said sides converging outwardly toward the other side, another slot arcuate in cross-section formed in said body member inwardly of the periphery thereof and communicating with said first named slot, the longitudinal axis of said another slot being disposed at an angle to the longitudinal axis of the body member in the same diametral plane and at an angle to the sides of said first named slot when such sides are extended to intersect said diametral plane, a cutter blade disposed in said first named slot, and a wedge complementary in shape to said second named slot disposed therein in bearing relation against one side of said blade.

2. An inserted blade cutting tool comprising a body member having a slot therein extending longitudinally of said body with its sides disposed at an angle to the longitudinal axis of the body member and having one of said sides converging outwardly toward the other side, another slot arcuate in cross-section formed in said body member inwardly of the periphery thereof and communicating with said first named slot, a cutter blade disposed in said first named slot, said blade having an outer cutting edge insert, and a wedge complementary in shape to said second named slot disposed therein in bearing relation against one side of said blade, the construction and arrangement of said another slot with respect to the first named slot and cutter blade being such that said wedge cannot engage said insert.

DONALDSON SEITER.